United States Patent
Johnson, II et al.

(10) Patent No.: US 10,016,753 B2
(45) Date of Patent: Jul. 10, 2018

(54) APPARATUS FOR REGENERATING CATALYST

(71) Applicant: UOP LLC, Des Plaines, IL (US)

(72) Inventors: Richard A. Johnson, II, Algonquin, IL (US); Paolo Palmas, Des Plaines, IL (US); Mohammad-Reza Mostofi-Ashtiani, Naperville, IL (US); Quan Yuan, Buffalo Grove, IL (US); James W. Althoff, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/265,456

(22) Filed: Sep. 14, 2016

(65) Prior Publication Data

US 2017/0080413 A1     Mar. 23, 2017

Related U.S. Application Data

(60) Provisional application No. 62/220,128, filed on Sep. 17, 2015.

(51) Int. Cl.
| | |
|---|---|
| *B01J 38/26* | (2006.01) |
| *B01J 8/12* | (2006.01) |
| *B01J 8/08* | (2006.01) |
| *B01J 8/26* | (2006.01) |
| *B01J 8/34* | (2006.01) |
| *C10G 11/18* | (2006.01) |

(52) U.S. Cl.
CPC .............. *B01J 38/26* (2013.01); *B01J 8/085* (2013.01); *B01J 8/12* (2013.01); *B01J 8/26* (2013.01); *B01J 8/34* (2013.01); *C10G 11/182* (2013.01); *B01J 2208/0084* (2013.01); *B01J 2208/00893* (2013.01); *B01J 2208/00938* (2013.01); *C10G 2300/708* (2013.01)

(58) Field of Classification Search
CPC ..... B01J 38/26; B01J 8/085; B01J 8/12; B01J 8/26; B01J 8/34; C10G 11/182
USPC ........................................................ 502/47
See application file for complete search history.

(56) References Cited

U.S. PATENT DOCUMENTS

| | | | | |
|---|---|---|---|---|
| 5,063,028 A | * | 11/1991 | Humble | ................. B01J 8/1872 110/245 |
| 7,947,230 B2 | * | 5/2011 | Palmas | ................. B01J 8/0055 422/139 |

* cited by examiner

*Primary Examiner* — Edward Johnson

(57) ABSTRACT

A baffle is installed on the wall of a regenerator vessel to push catalyst away from the wall to ensure adequate exposure to regeneration gas and complete combustion of coke from the catalyst. We have found that in deep beds, catalyst can flow down the walls and escape sufficient exposure to regeneration gas and undergo too little regeneration.

11 Claims, 1 Drawing Sheet

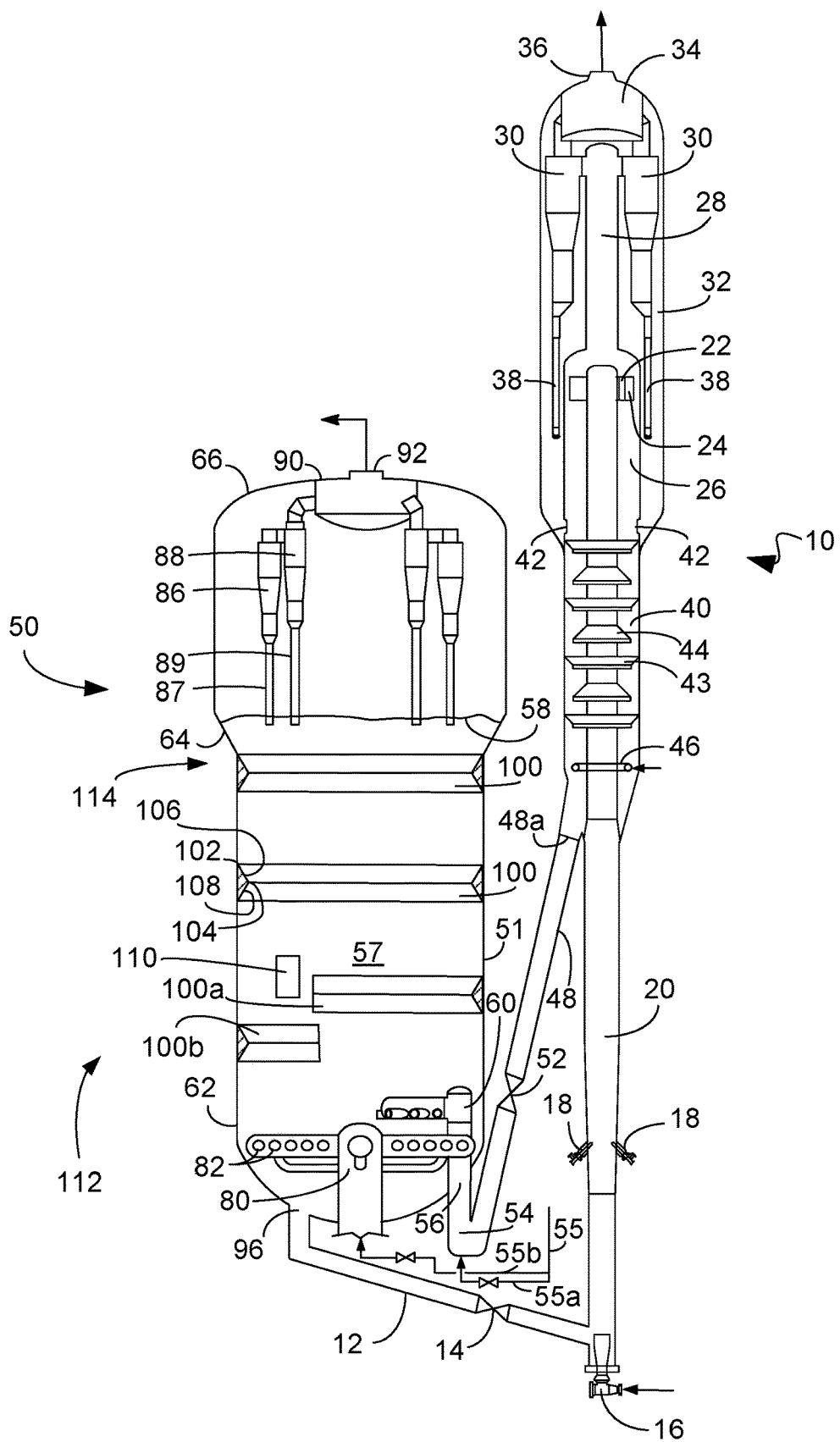

APPARATUS FOR REGENERATING CATALYST

CROSS-REFERENCE TO RELATED APPLICATION

This application claims priority from Provisional Application No. 62/220,128 filed Sep. 17, 2015, the contents of which are hereby incorporated by reference.

BACKGROUND

The field is the regeneration of catalyst in a catalyst regenerator vessel.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds, substantial amounts of highly carbonaceous material referred to as coke is deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen for sufficient residence time to permit thorough combustion.

Regenerators typically include a vessel having a coked catalyst inlet, a regenerated catalyst outlet and a regeneration gas distributor for supplying air or other oxygen containing gas to the bed of catalyst that resides in the vessel. Cyclone separators remove catalyst entrained in the flue gas before the gas exits the regenerator vessel.

In a bubbling bed regenerator, fluidizing regeneration gas forms bubbles that ascend through a discernible top interface of a dense catalyst bed. Only catalyst entrained in the gas exits the dense catalyst bed with the regeneration gas. The superficial velocity of the regeneration gas is typically less than 1.2 m/s (4.2 ft/s) and the density of the dense bed is typically greater than 320 kg/m$^3$ (20 lb/ft$^3$) depending on the characteristics of the catalyst.

A bubbling bed regenerator may have just one chamber in which air is bubbled through a dense catalyst bed. Coked catalyst is added and regenerated catalyst is withdrawn from the same dense catalyst bed. Relatively little catalyst is entrained in the flue gas exiting the dense bed. Two-stage bubbling bed regenerators have two chambers. Coked catalyst is added to a dense bed in a first chamber and is partially regenerated with air. The partially regenerated catalyst is transported to a dense bed in a second chamber and completely regenerated with air. The completely regenerated catalyst is withdrawn from the second chamber. Some bubbling bed regenerators have deep bubbling beds in which the interface between the dense catalyst phase and the dilute catalyst phase can be at least 7.6 m (25 feet) high.

Sufficient exposure of coked catalyst to regeneration gas is necessary to completely burn coke from the coked catalyst. Sufficient exposure requires thorough mixing of catalyst and regeneration gas and sufficient residence time for the coked catalyst and regeneration gas to be with each other.

Improved methods are sought for ensuring coked catalyst is sufficiently exposed to the regeneration gas.

SUMMARY

We have discovered that catalyst can flow down the walls of a regenerator. Baffles can be provided to push catalyst away from the walls to facilitate thorough catalyst regeneration.

One embodiment is a process for combusting coke from catalyst comprising delivering coked catalyst to a regenerator vessel. Regeneration gas is delivered to the regenerator vessel for combusting coke from the catalyst to produce flue gas and regenerated catalyst. Catalyst is pushed away from a wall of the regenerator vessel to ensure thorough regeneration. Flue gas is separated from the regenerated catalyst and regenerated catalyst and flue gas are discharged from the regenerator vessel.

An additional embodiment is a catalyst regenerator vessel for combusting coke from catalyst. The regenerator comprises a wall, a catalyst inlet for feeding catalyst to the vessel, a distributor for distributing regeneration gas to the vessel and a separator in communication with the regenerator vessel for separating gas from the catalyst. A baffle on the wall pushes catalyst away from the wall. A flue gas outlet discharges flue gas from the vessel and a regenerated catalyst outlet discharges regenerated catalyst from the vessel.

In a further embodiment a wall of the regenerator vessel is at least 7.6 meters in height.

BRIEF DESCRIPTION OF THE DRAWING

The FIGURE is a schematic, elevational view of an FCC unit.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "separator" means a vessel which has an inlet and at least two outlets.

DETAILED DESCRIPTION

Regenerators that have deep catalyst beds such as over about 7.6 meters (25 feet) are subject to flow distribution problems that can lead to incomplete regeneration of the catalyst. We have discovered that in these units a large downward annular flow of catalyst along the walls of the regenerator can lead to shorter residence time and insufficient contact of catalyst with the regeneration air. The coked catalyst returns to the reactor insufficiently active and does not convert feed as desired, so the unit suffers decreased yields. Understanding this phenomenon, a device to prevent downward catalyst flow along the walls of the regenerator will improve the catalyst regeneration and overall FCC performance. Deflector baffles attached to the walls of the regenerator will force the catalyst away from the wall and into the main section of the regenerator where the catalyst can be mixed with the air for complete regeneration.

Although other uses are contemplated, the process and apparatus may be embodied in an FCC unit. The FIGURE shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization medium such as steam from a nozzle 16 transports regenerated catalyst upwardly through the riser 20 at a relatively high density until a plurality of feed injection nozzles 18 inject hydrocarbon feed across the flowing stream of catalyst particles. The catalyst contacts the hydrocarbon feed cracking it to produce smaller, cracked hydrocarbon products while depositing coke on the catalyst to produce coked catalyst. Process conditions typically include a cracking reaction temperature of 400° to 600° C. and a pressure preferably of about 173 to about 414 kPa (gauge) (25 to 60 psig).

A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of no more than about 340° C. (644° F.), a T5 between about 340° C. (644° F.) to about 350° C. (662° F.), a T95 between about 555° C. (1031° F.) and about 570° C. (1058° F.) and an EP of no less than about 570° C. (1058° F.) prepared by vacuum fractionation of atmospheric residue. Such a fraction is generally low in coke precursors and heavy metal contamination which can serve to contaminate catalyst. Atmospheric residue is a another suitable feedstock boiling with an IBP of no more than about 340° C. (644° F.), a T5 between about 340° C. (644° F.) and about 360° C. (680° F.) and a T95 of between about 700° C. (1292° F.) and about 900° C. (1652° F.) and an EP of no less than about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive.

The resulting mixture continues upwardly through the riser 20 to a top at which a plurality of disengaging arms 22 tangentially and horizontally discharge the mixture of gas and catalyst from a top of the riser 20 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26 and the disengaging vessel 26 is considered part of the reactor vessel 32. A collection chamber 34 in the reactor vessel 32 gathers a separated hydrocarbon product vapor stream from the cyclones 30 for passage to an outlet nozzle 36 and eventually into a fractionation recovery zone that is not shown. Diplegs 38 discharge catalyst from the cyclones 30 into a lower portion of the reactor vessel 32 that eventually passes the catalyst and adsorbed or entrained hydrocarbons into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt-%, which is present in the form of coke. Although coke is primarily composed of carbon, it may contain from 3 to 12 wt-% hydrogen as well as sulfur and other materials.

The regenerator vessel 50 may be a bubbling bed type of regenerator as shown in the FIGURE. However, other regenerator vessels and other flow conditions may also be suitable. Particularly, a two-stage bubbling bed regenerator would be suitable. The regenerator vessel includes an outer wall 51 that defines a lower section 62, a frustoconical section 64 and an upper section 66. The outer wall 51 may be at least about 7.6 meters (25 feet) tall and is tubular and preferably cylindrical. The reactor catalyst conduit 48 with an inlet 48a in downstream communication with the reactor vessel 32 may transport coked catalyst to a regenerator riser 54 to which air or other oxygen-containing regeneration gas may be added through an outlet of a regeneration gas line 55 via riser gas line 55a. It is also contemplated that other lift gases may be used to lift the coked catalyst up the regenerator riser 54. In an embodiment, the coked catalyst descends the reactor catalyst conduit 48 to a bight which communicates with the regenerator riser 54. The coked catalyst bends around the bight as it is picked up by the lift gas from riser gas line 55a with an outlet in upstream communication with the regenerator riser 54. The coked catalyst then travels up the regenerator riser 54 and enters the lower section 62 of the regenerator vessel 50 through a coked catalyst inlet 56 into a dense catalyst bed 57. Coked catalyst is delivered to a catalyst distributor 60 in downstream communication with the catalyst inlet 56 and the outlet from riser gas line 55a. The distributor 60 distributes coked catalyst to the regenerator vessel 50.

Oxygen-containing regeneration gas, typically air, from regeneration gas line 55 is primarily delivered to the regenerator vessel 50 by a regeneration gas distributor 80 below the catalyst distributor 60. In an embodiment, regeneration gas distributor 80 distributes most or all of the regeneration gas to the regenerator vessel 50 and is fed by a distributor gas line 55b from regeneration gas line 55 regulated by a control valve. Flutes 82 in the regeneration gas distributor 80 are arranged to emit regeneration gas equally to the entire cross section of the regenerator vessel 50. The oxygen in the regeneration gas contacts the coked catalyst and combusts carbonaceous deposits from the catalyst to regenerate the catalyst and produce regenerated catalyst and flue gas.

The upper section 66 has a larger cross-sectional area than the lower section 62 of the regenerator vessel 50, and the frustoconical section 64 has a gradually increasing cross section as its height increases to transition between the lower section and the upper section. As the catalyst and the flue gas ascend above a top of the lower section 62 into the frustoconical section 64 and the upper section 66 to a larger cross-sectional area, a superficial gas velocity decreases to generate dilute phase conditions. Consequently, a discernible interface 58 between dense bed and dilute phase conditions is demarked at a top of the dense bed 57. Typically, the interface 58 generates in the frustoconical section 64 or in the bottom of the upper section 66. Catalyst gets entrained with flue gas ascending in the regenerator vessel 50 in the upper section. The catalyst entrained in the flue gas will therefore enter cyclone separators 86, 88 which centripetally separate flue gas from heavier catalyst particles. Catalyst particles will fall down dip legs 87, 89 and enter dense catalyst bed 58 again. Cleaned flue gas will ascend from the cyclone separators 86, 88 through ducts into plenum 90 and discharge through flue gas outlet 92. Regenerated catalyst will depart the dense catalyst bed 58 in the regenerator vessel 50 through a regenerated catalyst outlet 96. Regenerated catalyst conduit 12 in downstream communication with the outlet 96 delivers regenerated catalyst back to the reactor riser 20 at a rate regulated by control valve 14.

Regeneration gas such as air may be used to lift coked catalyst up the regenerator riser 54 which may allow regeneration to occur within the regenerator riser. The regeneration gas to the regenerator riser 54 may be 10-20 wt-% of regeneration gas to the regenerator vessel 50. If air is the regeneration gas, typically 12-15 kg (lbs) of air is required per kilogram (pound) of coke fed on catalyst to the regenerator. The temperature of the regenerator vessel 50 is about 500 to 900° C. and usually about 600 to 750° C. Pressure in the regenerator vessel 50 is preferably 173 to 414 kPa (gauge) (25 to 60 psig). The superficial velocity of the regeneration gas is typically less than 1.2 m/s (4.2 ft/s), but may be greater in some instances, and the density of the dense bed is typically greater than 320 kg/m$^3$ (20 lb/ft$^3$) depending on the characteristics of the catalyst. Preferably, the superficial velocity of the regeneration gas is typically less than 0.5 m/s (1.5 ft/s) and the density of the dense bed is typically greater than 640 kg/m$^3$ (40 lb/ft$^3$). The mixture of catalyst and gas is heterogeneous with pervasive vapor bypassing of catalyst.

We have discovered by Computational Fluid Dynamics modeling that a high proportion of coked catalyst annularly flows down around the wall of the regenerator vessel in the dense catalyst bed and avoids sufficient contact with the regeneration gas. This downwardly flowing catalyst avoids regeneration and exits the regenerator vessel 50 through exit 96 and goes back to the riser 20 with less than full activity resulting in poor conversion of feed and yield for the FCC unit. The problem is especially found in deep regenerator vessels having dense beds that are at least 7.6 meters (25 feet) high and is more acute when the dense bed is at least about 15 meters (50 feet) high and particularly when the dense bed is at least about 23 meters (75 feet) high.

With this problem discovered, a baffle 100 should be installed on the vessel wall 51 to ring the lower section 62 that contains the dense bed 57. The baffle 100 may be disposed between the cyclone separators 86 and 88 and the regeneration gas distributor 80. The baffle 100 may have an upper surface that pushes the downwardly flowing catalyst away from the wall 51 toward the center of the regenerator vessel 50 in the dense catalyst bed. A plurality 112 of baffles 100 may be used to push catalyst away from the wall 51.

The regenerator vessel 50 may have a lining that is not shown in an interior surface of the wall 51. The wall is made of steel, but the lining thickness may vary with type of application and other factors. However, in many applications the lining thickness will be between about 5.1 and about 30.5 cm (about 2 and about 12 inches). The baffles 100 extend inwardly from the wall 51 into the regenerator vessel 50. The baffles 100 extend circumferentially about the perimeter of the regenerator vessel 50 in the lower section 62 that contains the dense bed 57. The baffles 100 are configured to disrupt the downward flow path of the catalyst as it falls along the wall 51 of the regenerator vessel 50.

The baffle 100 may have a variety of shapes and sizes. The baffle 100 extends inwardly toward the center of the regenerator vessel 50 away from the wall 51 from an upper edge 102 on the wall 51 to an innermost peak 104 to define an upper surface 106. The baffle may have a horizontal upper surface but it may be sloped. Preferably, the upper surface is sloped downwardly, so catalyst is pushed away from the wall in a downwardly sloping direction. The baffle 100 may comprise a plate defining the upper surface 106. The baffle 100 may comprise an additional plate extending from the first plate at a different angle than defined by the first plate with the wall 51. Optionally, the baffle 100 may have a lower surface 108 that may be more than just a parallel bottom surface of the plate defining the upper surface 106. The lower surface 108 may gradually retreat from the peak 104 toward the wall 51 to a lower edge of the baffle 100 on the wall 51 in a slope to facilitate upwardly moving catalyst and gas. For example, the baffle 100 may have a generally triangular cross section and generally geometrically favor a triangulated venturi style flow restriction. In some embodiments, the cross section of the baffle 100 defines a generally obtuse isosceles triangle. The peak 104 may be rounded or take other shapes. The baffle 100 may also have a trapezoidal cross sectional configuration comprising a side oriented closely to vertical between the top surface 106 and the lower surface 108. In an embodiment, the upper surface 106 defines a larger internal angle with the wall 51 than an internal angle defined by the lower surface 108 and the wall. Additionally, baffles 100 may adopt different shapes than that described. The lining on the wall 51 may continuously cover the baffles 100 which can also be made of steel.

In an embodiment, a baffle 100 should be disposed near the top of the dense bed 57 at a top 114 of the lower section 62 below or near the point where the cross section of the regenerator vessel 50 begins to enlarge. Specifically, a baffle 100 should be positioned in the top seventh of the lower section. Accordingly, catalyst is pushed away from the wall 51 near a top of the dense catalyst bed 57 and at a top of the lower section 62 of the regenerator vessel 50.

A plurality 112 of baffles 100 may be positioned at a plurality of levels in the lower section 62 where the dense bed 57 will be formed, so catalyst is pushed away from the wall 51 at a plurality of elevations. The baffles 100 may be evenly spaced apart or not evenly spaced. The baffles 100 may be spaced about 5 to about 7 meters (16 to about 23 feet) apart. Baffles may extend into the regenerator vessel 50 by about 0.3 to about 1 meter (1 to about 3 feet) from the wall 51.

The baffle 100 may comprise a continuous ring around the perimeter or circumference of the regenerator vessel 50, so the catalyst is pushed away from the wall 51 around an entire perimeter or circumference of the regenerator vessel 50. As such, the baffle 100 should extend around the entire lateral perimeter of the regenerator vessel 50. In some cases, an obstacle 110 such as a man way on the wall 51 may hinder a baffle 100 from continuously ringing the entire perimeter. Nevertheless, a baffle 100 may comprise a series of segments 100a and 100b that together may extend around the entire horizontal perimeter of the regenerator vessel while the baffle segments 100a and 100b are positioned at different elevations on the wall 51 of the regenerator vessel 50. Accordingly, the baffle segments 100a and 100b push the downwardly flowing catalyst away from the wall around the entire horizontal perimeter of the regenerator vessel 50 but at different elevations on the wall 51. Ends of the baffle segments 100a and 100b may overlap vertically or may extend to the same vertical position.

Specific Embodiments

While the following is described in conjunction with specific embodiments, it will be understood that this description is intended to illustrate and not limit the scope of the preceding description and the appended claims.

A first embodiment is a process for combusting coke from catalyst comprising delivering coked catalyst to a regenerator vessel; delivering regeneration gas to the regenerator vessel for combusting coke from the catalyst to produce flue gas and regenerated catalyst; pushing catalyst away from a wall of the regenerator vessel; separating the flue gas from the regenerated catalyst; discharging regenerated catalyst from the regenerator vessel; and discharging flue gas from the regenerator vessel. An embodiment is one, any or all of prior embodiments in this paragraph up through the first embodiment in this paragraph further including allowing catalyst to flow downwardly along a wall of the regenerator vessel and pushing downwardly flowing catalyst away from the wall. An embodiment is one, any or all of prior embodiments in this paragraph up through the first embodiment in this paragraph wherein the regenerator is a bubbling bed regenerator. An embodiment is one, any or all of prior embodiments in this paragraph up through the first embodiment in this paragraph wherein the catalyst is pushed away from the wall in a dense catalyst bed. An embodiment is one, any or all of prior embodiments in this paragraph up through the first embodiment in this paragraph wherein the catalyst is pushed away from the wall near a top of the dense catalyst bed. An embodiment is one, any or all of prior embodiments in this paragraph up through the first embodiment in this paragraph further comprising pushing catalyst away from the wall around an entire perimeter of the regenerator vessel. An embodiment is one, any or all of prior embodiments in this paragraph up through the first embodiment in this paragraph further comprising pushing catalyst away from the wall around the entire perimeter but at different elevations. An embodiment is one, any or all of prior embodiments in this paragraph up through the first embodiment in this paragraph further comprising pushing catalyst away from the wall at different elevations. An embodiment is one, any or all of prior embodiments in this paragraph up through the first embodiment in this paragraph further comprising pushing catalyst away from the wall in a downwardly sloping direction.

A second embodiment is a catalyst regenerator vessel for combusting coke from catalyst comprising a wall of the regenerator vessel; a catalyst inlet for feeding catalyst to the vessel; a distributor for distributing regeneration gas to the vessel; a baffle on the wall for pushing catalyst away from the wall; a separator in communication with the regenerator vessel for separating gas from the catalyst; a flue gas outlet for discharging flue gas from the vessel; and a regenerated catalyst outlet for discharging regenerated catalyst from the vessel. An embodiment is one, any or all of prior embodiments in this paragraph up through the second embodiment in this paragraph wherein the baffle is disposed between the separator and the distributor. An embodiment is one, any or all of prior embodiments in this paragraph up through the second embodiment in this paragraph wherein the baffle has a triangular cross section. An embodiment is one, any or all of prior embodiments in this paragraph up through the second embodiment in this paragraph wherein the baffle extends around the entire horizontal perimeter of the regenerator vessel. An embodiment is one, any or all of prior embodiments in this paragraph up through the second embodiment in this paragraph wherein the baffle comprises a series of segments that extend around the entire horizontal perimeter of the regenerator vessel and segments are positioned at different elevations. An embodiment is one, any or all of prior embodiments in this paragraph up through the second embodiment in this paragraph wherein the regenerator vessel includes a lower section and an upper section which has a cross-sectional area that is greater than the lower section and the baffle is located at a top of the lower section. An embodiment is one, any or all of prior embodiments in this paragraph up through the second embodiment in this paragraph further comprising a plurality of baffles on the wall. An embodiment is one, any or all of prior embodiments in this paragraph up through the second embodiment in this paragraph wherein the baffle has a sloped upper surface. An embodiment is one, any or all of prior embodiments in this paragraph up through the second embodiment in this paragraph further comprising a bubbling bed regenerator. An embodiment is one, any or all of prior embodiments in this paragraph up through the second embodiment in this paragraph wherein the lower section is at least 7.6 meters high.

A third embodiment is a catalyst regenerator vessel for combusting coke from catalyst comprising a wall of the regenerator vessel of at least 7.6 meters in height; a catalyst inlet for feeding catalyst to the vessel; a distributor for distributing regeneration gas to the vessel; a baffle on the wall for pushing catalyst away from the wall; a separator in communication with the regenerator vessel for separating gas from the catalyst; a flue gas outlet for discharging flue gas from the vessel; and a regenerated catalyst outlet for discharging regenerated catalyst from the vessel.

Without further elaboration, it is believed that using the preceding description that one skilled in the art can utilize the present disclosure to its fullest extent and easily ascertain the essential characteristics, without departing from the spirit and scope thereof, to make various changes and modifications and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A catalyst regenerator vessel for combusting coke from catalyst comprising:
   a wall of said regenerator vessel;
   a catalyst inlet for feeding catalyst to said vessel;
   a distributor for distributing regeneration gas to said vessel;
   a baffle on said wall for pushing catalyst away from said wall;
   a separator in communication with said regenerator vessel for separating gas from said catalyst;
   a flue gas outlet for discharging flue gas from said vessel; and
   a regenerated catalyst outlet for discharging regenerated catalyst from said vessel.

2. The catalyst regenerator vessel of claim 1 said baffle is disposed between said separator and said distributor.

3. The catalyst regenerator vessel of claim 1 wherein said baffle has a triangular cross section.

4. The catalyst regenerator vessel of claim 1 wherein said baffle extends around the entire horizontal perimeter of said regenerator vessel.

5. The catalyst regenerator vessel of claim 4 wherein said baffle comprises a series of segments that extend around the entire horizontal perimeter of said regenerator vessel and segments are positioned at different elevations.

6. The catalyst regenerator vessel of claim 1 wherein said regenerator vessel includes a lower section and an upper section which has a cross-sectional area that is greater than said lower section and said baffle is located at a top of said lower section.

7. The catalyst regenerator vessel of claim 1 further comprising a plurality of baffles on said wall.

8. The catalyst regenerator vessel of claim 1 wherein said baffle has a sloped upper surface.

9. The catalyst regenerator vessel of claim 1 further comprising a bubbling bed regenerator.

10. The catalyst regenerator vessel of claim 1 wherein said lower section is at least 7.6 meters high.

11. A catalyst regenerator vessel for combusting coke from catalyst comprising:
    a wall of said regenerator vessel of at least 7.6 meters in height;
    a catalyst inlet for feeding catalyst to said vessel;
    a distributor for distributing regeneration gas to said vessel;
    a baffle on said wall for pushing catalyst away from said wall;
    a separator in communication with said regenerator vessel for separating gas from said catalyst;
    a flue gas outlet for discharging flue gas from said vessel; and
    a regenerated catalyst outlet for discharging regenerated catalyst from said vessel.

* * * * *